(12) United States Patent
Smith et al.

(10) Patent No.: US 9,086,184 B2
(45) Date of Patent: *Jul. 21, 2015

(54) SYSTEM AND METHOD FOR CONDUIT REPARATION

(75) Inventors: Mark A. Smith, Natrona Heights, PA (US); Thomas Marti, Mars, PA (US); Bryan St. Onge, Tarpon Springs, FL (US); Henri St. Onge, Hastings (CA)

(73) Assignee: Underground Solutions Technologies Group, Inc., Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,593

(22) Filed: Apr. 16, 2012

(65) Prior Publication Data

US 2012/0193027 A1 Aug. 2, 2012

Related U.S. Application Data

(60) Continuation of application No. 12/254,240, filed on Oct. 20, 2008, now abandoned, which is a division of application No. 10/865,738, filed on Jun. 10, 2004, now abandoned.

(60) Provisional application No. 60/478,594, filed on Jun. 13, 2003.

(51) Int. Cl.
*B29C 73/12* (2006.01)
*F16L 55/165* (2006.01)
*E03B 7/00* (2006.01)

(52) U.S. Cl.
CPC ............. *F16L 55/1654* (2013.01); *B29C 73/12* (2013.01); *E03B 7/006* (2013.01)

(58) Field of Classification Search
CPC . F16L 55/165; F16L 55/1654; F16L 55/1655; F16L 55/1656; F16L 55/1657; F16L 55/1658; B29C 73/12; E03B 7/006
See application file for complete search history.

(56) References Cited

U.S. PATENT DOCUMENTS

| 4,026,329 A | 5/1977 | Thompson |
| 4,067,349 A | 1/1978 | Austin et al. |
| 4,162,093 A | 7/1979 | Sigmund |
| 4,361,451 A | 11/1982 | Renaud |
| 4,646,787 A | 3/1987 | Rush et al. |
| 4,671,840 A | 6/1987 | Renaud |

(Continued)

FOREIGN PATENT DOCUMENTS

| EP | 1 001 206 A | 5/2000 |
| JP | 08 127069 A | 5/1996 |
| WO | WO 01/77569 A | 10/2001 |

OTHER PUBLICATIONS

U.S. Appl. No. 10/865,739, filed Jun. 10, 2004.

(Continued)

*Primary Examiner* — George Koch
(74) *Attorney, Agent, or Firm* — The Webb Law Firm

(57) ABSTRACT

Disclosed is a system and method for conduit expansion for use in expanding a liner conduit within a host conduit. The system includes injection hardware positioned on a first end of the liner conduit and the host conduit, and distal end cap hardware positioned on a second end of the host conduit and liner conduit. Both the injection hardware and the distal end cap hardware are in communication with a control mechanism for use in monitoring and/or controlling the operating parameters of the system.

19 Claims, 3 Drawing Sheets

(56) References Cited

U.S. PATENT DOCUMENTS

| | | |
|---|---|---|
| 4,691,728 A | 9/1987 | Mathison |
| 4,728,223 A | 3/1988 | Rice |
| 4,778,553 A | 10/1988 | Wood |
| 4,980,116 A | 12/1990 | Driver |
| 5,225,121 A | 7/1993 | Yokoshima |
| 5,346,658 A | 9/1994 | Gargiulo |
| 5,368,809 A | 11/1994 | Steketee, Jr. |
| 5,397,513 A | 3/1995 | Steketee, Jr. |
| 5,399,301 A | 3/1995 | Menendez et al. |
| 5,439,033 A | 8/1995 | Kamiyama et al. |
| 5,462,706 A | 10/1995 | McMillan et al. |
| 5,487,411 A | 1/1996 | Goncalves |
| 5,490,964 A | 2/1996 | Kamiyama et al. |
| 5,501,248 A | 3/1996 | Kiest, Jr. |
| 5,503,190 A | 4/1996 | Kamiyama et al. |
| 5,601,763 A | 2/1997 | Hunter et al. |
| 5,706,861 A | 1/1998 | Wood et al. |
| 5,794,662 A | 8/1998 | St. Onge et al. |
| 5,816,293 A | 10/1998 | Kiest, Jr. |
| 5,855,729 A | 1/1999 | Kiest, Jr. et al. |
| 5,924,455 A | 7/1999 | Jo et al. |
| 5,927,341 A | 7/1999 | Taylor |
| 6,050,300 A | 4/2000 | Schwert et al. |
| 6,053,211 A | 4/2000 | Schwert et al. |
| 6,093,363 A | 7/2000 | Polivka |
| 6,228,312 B1 | 5/2001 | Boyce |
| 6,270,289 B1 | 8/2001 | Einhaus et al. |
| 6,276,398 B1 | 8/2001 | Lange |
| 6,299,803 B1 | 10/2001 | Ledoux |
| 6,416,692 B1 | 7/2002 | Iwasaki-Higbee |
| 6,539,979 B1 | 4/2003 | Driver |
| 7,000,643 B2 | 2/2006 | St. Onge et al. |
| 8,137,599 B2 * | 3/2012 | Smith et al. ................. 264/36.17 |
| 2003/0015247 A1 | 1/2003 | Driver et al. |
| 2009/0038703 A1 | 2/2009 | Smith et al. |

OTHER PUBLICATIONS

U.S. Appl. No. 12/347,121, filed Dec. 31, 2008.

* cited by examiner

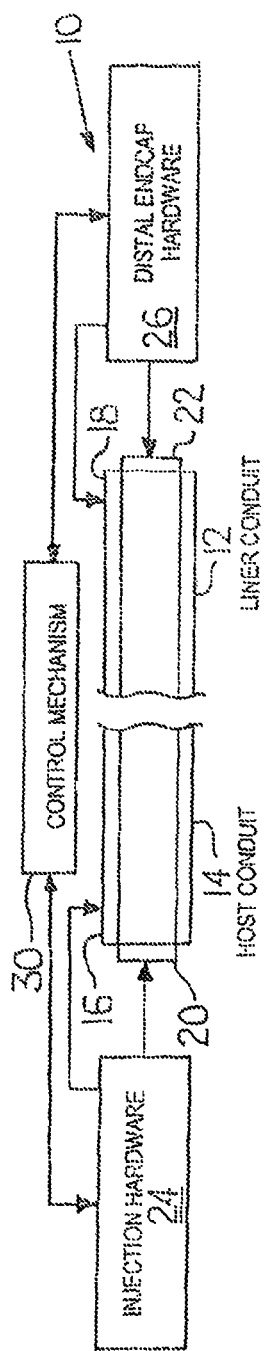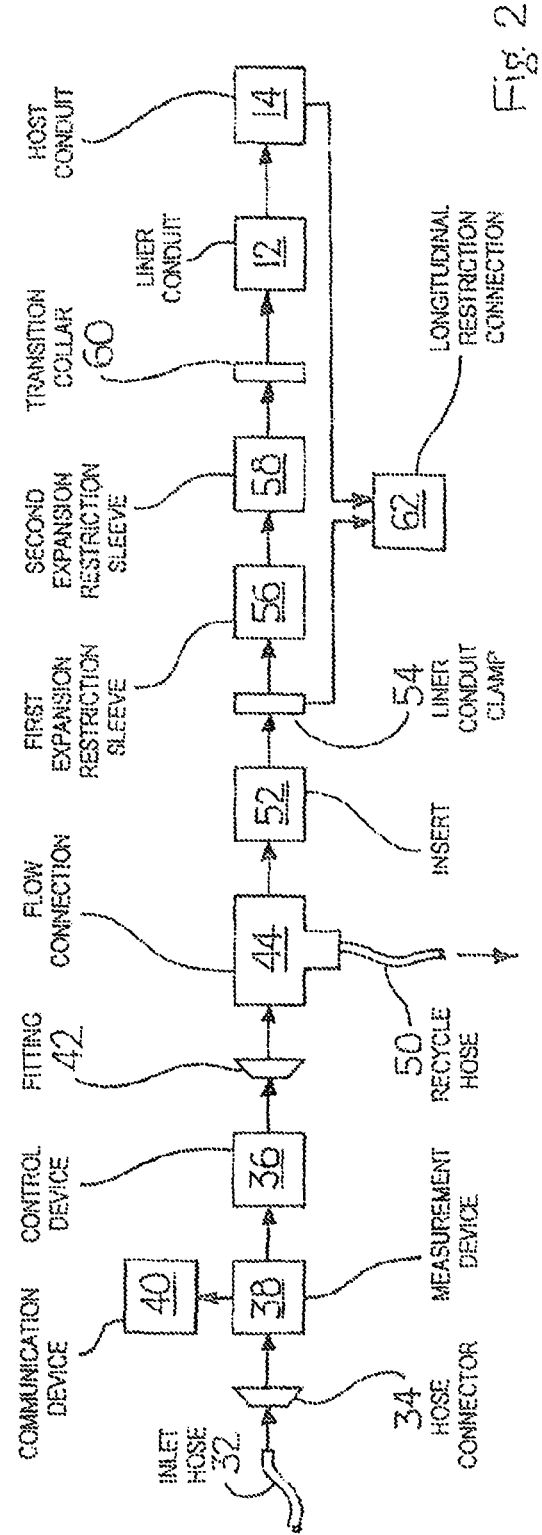

SYSTEM AND METHOD FOR CONDUIT REPARATION

CROSS REFERENCE TO RELATED APPLICATIONS

This application is a continuation application of U.S. application Ser. No. 12/254,240, filed Oct. 20, 2008, which is a divisional application of U.S. application Ser. No. 10/865,738, filed Jun. 10, 2004 which takes benefit of priority to U.S. Provisional Patent Application No. 60/478,594, filed Jun. 13, 2003, which are incorporated herein by reference in their entirety.

BACKGROUND OF THE INVENTION

1. Field of the Invention

The present invention relates generally to systems for repairing, lining or expanding conduit, such as expanding a liner conduit within a host conduit and, in particular, to a system and arrangement with accompanying hardware for repairing a conduit, for example expanding a liner conduit within a host conduit.

2. Description of Related Art

Conduit systems are used extensively throughout the world in order to transfer or convey material, such as water and other fluids, from location to location for distribution throughout the system. For example, extensive conduit systems are used to distribute water to both residences and businesses for use and further processes. Typically, such conduit or piping systems are located underground, as aboveground piping would be both unsightly and intrusive.

Typical water conduit systems transport material through pipe, e.g., cast iron, ductile iron, reinforced concrete, asbestos-cement, etc., buried underground with the branches extending in various directions in order to reach the end user. Normally, after many years of use, or for some other reason, the present piping fails and begins to leak, thereby reducing line pressure and unnecessarily allowing water to leak into the area surrounding the piping. Such leaks not only affect the system, but increase the processing costs of the supplier, which, in turn, increases the end user costs. Therefore, these leaks must be quickly repaired and preventative measures taken to ensure that further leakage is prevented.

Due to the underground positioning of the conduit system, repairing a leaking pipe is particularly labor intensive and time consuming. Trenches must be dug along the pipeline to locate the leak and effectively repair it prior to putting the pipe back in service. Various lining systems have been developed according to the prior art in an attempt to seal a leaking pipe or a pipe that has fallen into disrepair, whether to repair a present crack or to preventatively ensure against future cracks or breaks. In addition, the use of a much smaller diameter pipe within the larger diameter cracked or broken pipe has been used. However, this merely replaces the problem of a cracked outer pipe with a cracked or otherwise leaking inner pipe. Still further, using such a pipe-in-pipe system drastically reduces the flow through the conduit system and evidences unwanted and varying pressure parameters.

To that end, a pipe liner and method of installation have been developed, as disclosed in U.S. Pat. No. 5,794,662 to St. Onge et al., specifically directed to pressurized pipeline applications. The St. Onge patent is directed to a method of relining sewer lines, water lines or gas lines, and uses a segmented liner of reduced size relative to the pipe being relined. However, as opposed to merely leaving the small diameter liner conduit within the large diameter outer conduit, the method of the St. Onge patent uses heat and/or pressure to mold the reduced size pipe to the shape of the pipe being relined. In particular, the inner or liner conduit is a thermoplastic pipe, typically a polyvinyl chloride (PVC) pipe that, when exposed to heat or pressure, expands and molds against the inside of an existing conduit to effect the relining of it. This process allows for both the lining of the entire length of pipe or only a portion of it that is damaged, which is typically referred to as "spot repair."

According to the St. Onge patent, once the length of the liner conduit is inserted into the existing or host conduit, the liner conduit is plugged at either end and exposed to steam under pressure to heat the liner conduit along its length and apply pressure, which urges it to expand and contact the interior walls of the surrounding host conduit. Once the liner conduit has fully expanded to conform to the interior surface of the existing conduit, it is cooled and the plugs are removed. The resulting expanded liner conduit conforms to the walls of the host conduit, thereby preventing any further leakage. Also, the method of the St. Onge patent requires only access pits to be dug at either end of the section to be repaired.

While the St. Onge patent represents an advance in the art of relining or repairing underground conduit systems, there is room in the art for additional improvements and advancements. Merely plugging either end of the liner conduit and injecting steam to pressurize the liner conduit and force it to expand to the walls of the host conduit presents certain problems. Such a method and system give rise to both physical and structural weaknesses at either end of the expanded liner conduit.

Various arrangements and systems have been developed for assisting in the injection of gas and/or liquid into a liner or within a lining process, as is known in the art. For example, hardware and equipment have been developed for use in connection with a bladder expansion or thermoplastic impregnated liner system. See U.S. Pat. No. 6,299,803 to Ledoux; U.S. Pat. No. 5,601,763 to Hunter et al.; U.S. Pat. No. 5,462,706 to McMillan et al.; U.S. Pat. No. 5,503,190 to Kamiyama et al.; U.S. Pat. No. 5,490,964 to Kamiyama et al.; U.S. Pat. No. 5,225,121 to Yokoshima; U.S. Pat. No. 6,050,300 to Schwert et al.; U.S. Pat. No. 4,728,223 to Rice; U.S. Pat. No. 4,671,840 to Renaud; U.S. Pat. No. 4,361,451 to Renaud; U.S. Pat. No. 6,539,979 to Driver; U.S. Pat. No. 5,368,809 to Steketee, Jr.; and U.S. Pat. No. 5,399,301 to Menendez et al. However, such equipment and systems have several drawbacks. Without controlled restriction of the liner conduit within the host conduit, undesirable longitudinal or lateral expansion may occur, which may lead to the ultimate failure of the liner conduit. Further, monitoring and/or controlling the heat and/or pressure of the material injected into the liner conduit is required in order to appropriately expand the liner conduit within the host conduit. In addition, monitoring and/or controlling various physical parameters in the conduit is important to effectively repair the conduit and engage in the associated process. Accordingly, such prior art systems are deficient in control and are thus subject to failures in installation, maintenance and lining integrity.

SUMMARY OF THE INVENTION

It is, therefore, an object of the present invention to provide a system and arrangement for conduit reparation that overcomes the deficiencies of the prior art. It is another object of the present invention to provide a system and arrangement for conduit reparation and expansion that provides appropriate lateral and longitudinal restriction and increases the resulting structural integrity of both the liner conduit and/or host conduit. It is a still further object of the present invention to provide a system and arrangement for conduit reparation that includes the appropriate hardware at either end of a pipe section that monitors and controls the process. It is a still further object of the present invention to provide a system and arrangement that effectively controls a conduit reparation process or pipe reparation process.

Accordingly, the present invention is directed to an arrangement for use in connection with a conduit reparation process having a target conduit with a first end and a second end. The arrangement includes injection hardware in operative communication with the first end of the target conduit and distal end hardware in operative communication with the second end of the target conduit. The arrangement also includes a control mechanism in communication with at least one of the injection hardware and the distal end hardware for communicating with and/or controlling the conduit reparation process, the injection hardware and the distal end hardware.

In a preferred and non-limiting embodiment, the control mechanism can (i) monitor at least one physical characteristic of at least one of the injected material and recycled material; (ii) control at least one physical characteristic of injected material and/or recycled material; (iii) monitor at least one physical characteristic of the lining process; (iv) control at least one physical characteristic of the lining process; (v) monitor at least one physical characteristic of a host conduit and/or a liner conduit; and (vi) control at least one physical characteristic of the host conduit and/or the liner conduit. In addition, in a further embodiment, the injection hardware and/or the distal end hardware includes one or more measurement devices for measuring the physical characteristics or parameters of the injected material, the lining process, the host conduit and/or the liner conduit. For example, the measurement device measures the pressure of the injected material, the temperature of the injected material, a surface temperature of the host conduit and/or a surface temperature of the liner conduit.

In another preferred and non-limiting embodiment, the injection hardware and/or the distal end hardware include a communication device in communication with the control mechanism for transmitting, processing and/or receiving signals. The communication device preferably wirelessly communicates with the control mechanism. The control mechanism is typically a computing device, such as a portable computer, laptop, a PDA, a palmtop, a computer, a personal computer, a networked computer or a server.

In a further preferred and non-limiting embodiment, the control mechanism is loaded with control software to enable the control mechanism to perform various functions and actions. For example, the control software may allow the control mechanism to (i) receive and process signals transmitted from at least one of the injection hardware and the distal end hardware; (ii) transmit signals to at least one of the injection hardware and the distal end hardware; (iii) monitor at least one physical characteristic of at least one of the lining process, the injection hardware, the distal end hardware, a material in contact with the injection hardware, a material in contact with the distal end hardware; (iv) track at least one physical characteristic of at least one of the lining process, the injection hardware, the distal end hardware, a material in contact with the injection hardware, a material in contact with the distal end hardware; (v) control at least one physical characteristic of at least one of the lining process, the injection hardware, the distal end hardware, a material in contact with the injection hardware, a material in contact with the distal end hardware; (vi) control operation of at least one component of at least one of the injection hardware and the distal end hardware; and (vii) storing data directed to at least one physical characteristic of at least one of the lining process, the injection hardware, the distal end hardware, a material in contact with the injection hardware, a material in contact with the distal end hardware, an operation parameter of the injection hardware and an operation parameter of the distal end hardware.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 1 is a schematic view of a system and arrangement for conduit reparation according to the present invention, wherein the conduit reparation method includes a conduit expansion process;

FIG. 2 is a schematic view of a preferred embodiment of injection hardware used in connection with the system and arrangement of FIG. 1;

DESCRIPTION OF THE PREFERRED EMBODIMENTS

Figure 3:
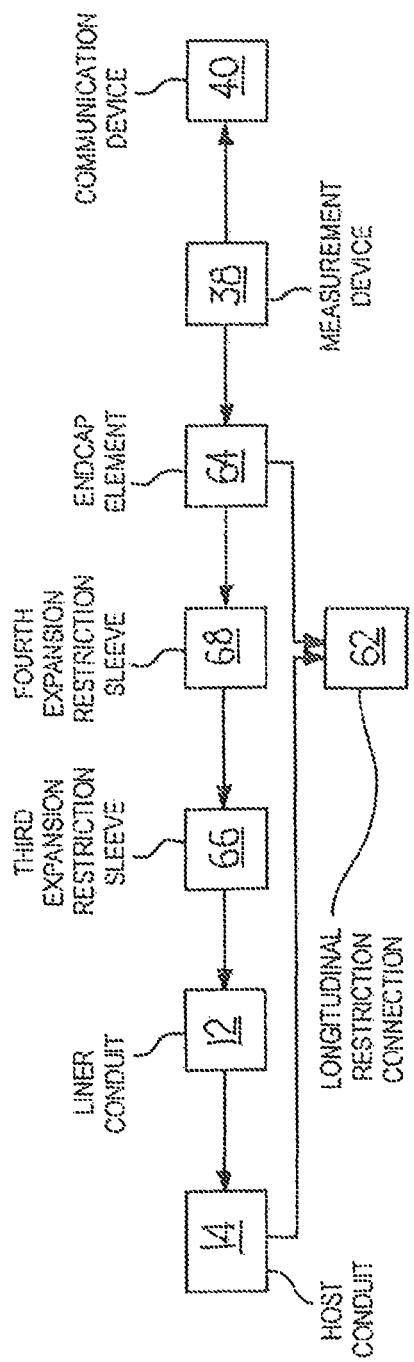
FIG. 3 is a schematic view of a preferred embodiment of distal end cap hardware used in connection with the system and arrangement of FIG. 1.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is a system 10 and arrangement for conduit expansion and is illustrated in various embodiments in FIGS. 1-5. It is envisioned that the system 10 can be used in connection with various conduit reparation methods and processes. For example, the system 10 may be used in connection with a conduit expansion process, as discussed in detail hereinafter. However, the system 10 may also be used in connection with slip-lining methods, bladder-based systems, material-impregnated liners and other similar conduit reparation processes. As discussed hereinafter, the system 10 is useful when repairing a damaged conduit, and is particularly preferable when used with methods wherein the conduit is an underground pipe, which need not be longitudinally unearthed prior to reparation. It is also envisioned that the control and communication aspects of the system 10 can be used in connection with various lengths of aboveground conduit as well, for example for manufacturing, maintenance, preparation and similar activities. Accordingly, the presently-invented system 10, as described hereinafter, may be utilized with many different conduit-based applications and provides novel control and communication aspects to these applications.

The present invention is an arrangement and system 10 that is utilized in connection with a conduit reparation process having a target conduit or host conduit 14. Injection hardware 24 is engaged with and in operative communication with a first end 16 of the host conduit 14, and distal end hardware 26 is engaged with and in operable communication with a second end 18 of the host conduit 14. A control mechanism 30 is in communication with the injection hardware 24 and/or the distal end hardware 26. This control mechanism 30 provides communication with and/or control of the pipe lining or reparation process, the injection hardware 24 and/or the distal end hardware 26. Accordingly, the control mechanism 30 acts to monitor parameters, communicate with the hardware 24, 26 and otherwise allow for the control of the components and sub-components of the hardware 24, 26.

In one preferred and non-limiting embodiment, the system 10 may be adapted for beneficial use in conduit expansion process, as illustrated in FIG. 1. As seen in FIG. 1, the system 10 is used in connection with a liner conduit 12 positioned within a host conduit 14. In a preferred embodiment, the liner conduit 12 is manufactured from a thermoplastic material, such as polyvinyl chloride, polyethylene, etc. However, it is envisioned that any material having the appropriate expansion characteristics can be used. The system 10 works equally effectively with any expandable liner conduit 12, bladder, liner bag, impregnated bladder, etc.

In this embodiment, after a particular portion of the host conduit 14 is identified for repair or lining, access is gained, typically by digging a trench to the host conduit first end 16 and the host conduit second end 18. Using known bend characteristics and measurements, the liner conduit 12 is fed through the host conduit first end 16 until a liner conduit first end 20 is located adjacent the host conduit first end 16, and a liner conduit second end 22 is located adjacent the host conduit second end 18. In this manner, the liner conduit 12 is positioned within the host conduit 14 and ready for the expansion process.

After positioning, the injection hardware 24 is engaged with and in operative communication with the host conduit first end 16 and/or liner conduit first end 20. Similarly, the distal end hardware 26 is engaged with and in operable communication with the host conduit second end 18 and/or the liner conduit second end 22. Once the injection hardware 24 and the distal end cap hardware 26 are engaged, the system 10 is ready for the injection of a material 28, such as steam, air or fluid, into the liner conduit 12.

In order to monitor and/or control the various components, sub-components and the process physical parameters, the control mechanism 30 is used and is in communication with, preferably, both the injection hardware 24 and the distal end cap hardware 26. By using the control mechanism 30, the system 10 becomes a monitored, controlled and easily and accurately duplicated process. In a preferred and non-limiting embodiment, the control mechanism 30 can (i) monitor at least one physical characteristic of at least one of injected material and recycled material; (ii) control at least one physical characteristic of the injected material and/or the recycled material; (iii) monitor at least one physical characteristic of the reparation process; (iv) control at least one physical characteristic of the reparation process; (v) monitor at least one physical characteristic of a host conduit 14 and/or a liner conduit 12; and (vi) control at least one physical characteristic of the host conduit 14 and/or the liner conduit 12. In addition, in a further embodiment, the injection hardware 24 and/or the distal end hardware 26 includes one or more measurement devices 38 for measuring the physical characteristics or parameters of the injected material, the reparation process, the host conduit 14 and/or the liner conduit 12. For example, the measurement device 38 measures the pressure of the injected material, the temperature of the injected material, a surface temperature of the host conduit 14 and/or a surface temperature of the liner conduit 12.

A preferred embodiment of the injection hardware 24 is illustrated in FIG. 2. In this preferred and non-limiting embodiment, the injected material 28 is a fluid, such as water. In addition, the various components and subcomponents of the injection hardware 24 and system 10, as described in detail hereinafter, are described according to function, as opposed to order of connection. One of ordinary skill in the art would understand how to physically connect these various subcomponents in the correct order and use the correct inter-relationships in order to arrive at this preferred embodiment of the injection hardware 24.

As the present embodiment preferably uses a fluid material 28, an inlet hose 32 is engaged with a hose connector 34. The hose connector 34 is in fluid communication with a control device 36, which can be used to shut off, throttle back or otherwise adjust the flow characteristics of the material 28. Also, as seen in this embodiment, the measurement device 38 is positioned between the hose connector 34 and the control device 36. Further, this measurement device 38 measures various operating parameters, such as pressure and/or temperature of the injected material 28. Still further, the measurement device 38 is in communication with a communication device 40 capable of receiving, processing and transmitting signals, and the communication device 40 is in further communication with the control mechanism 30. In one preferred and non-limiting embodiment, the communication device 40 is a transmitter that wirelessly transmits data to the control mechanism 30. It is further envisioned that the control mechanism 30 can communicate with the control device 36 and provide for wireless control of the injection of material 28. Still further, the communication device 40 may be hardwired to control mechanism 30.

The control device 36 is engaged with a fitting 42, which is, in turn, connected to a flow connection 44. The flow connection 44 is a T-shaped connector and has an injection port 46 and a recycle port 48. The recycle port 48 is in operative communication with a recycle hose 50, which transfers and recycles the material 28 back to a fluid system (not shown).

The injection port 46 is positioned adjacent an insert 52. The insert 52 is at least partially engaged within the liner conduit first end 20. Further, the insert 52 is a wedge-shaped connection that is frictionally engaged with and expanded against an inside wall of the liner conduit 12. A liner conduit clamp 54 is engaged with an outside wall of the liner conduit first end 20 and locks the liner conduit first end 20 between the liner conduit clamp 54 and the insert 52.

In order to prevent lateral or circumferential expansion of the liner conduit 12, a first expansion restriction sleeve 56 is positioned near the liner conduit first end 20. This first expansion restriction sleeve 56 is bolted or otherwise removably engaged with the liner conduit 12 and provides rigid restriction against expansion during the expansion process. It is also envisioned that the measurement device 38 is in communication with the liner conduit 12 at or near the first expansion restriction sleeve 56 and measures the skin temperature of the liner conduit 12. Next, a second expansion restriction sleeve 58 is engaged around and provides rigid expansion restriction with respect to the liner conduit 12. Again, bolts, clamps or other means of connecting the second expansion restriction sleeve 58 in an abutting relationship with the liner conduit 12 is envisioned.

A transition collar 60 is positioned adjacent an end of the second expansion restriction sleeve 58 and in an abutting relationship with the host conduit first end 16. The transition collar 60 is shaped as a tapered element and provides a surface to which the liner conduit 12 can expand immediately adjacent the host conduit first end 16. Without this transition collar 60, and due to the thickness of the host conduit 14, the liner conduit 12 could continue expanding and create a gap or ridge immediately adjacent the host conduit first end 16, which would decrease the structural integrity at that point.

Finally, a longitudinal restriction connection 62 is in engagement with and in operable communication with the host conduit 14 and the liner conduit clamp 54. This generally, longitudinally-extending restriction connection 62 provides rigid connection between the host conduit 14 and other components of the injection hardware 24 and rigidly prevents undesirable longitudinal expansion during the process.

A preferred and non-limiting embodiment of the distal end hardware 26 is illustrated in FIG. 3. Again, the components and subcomponents described hereinafter are with reference to function and connection, as opposed to order of attachment. Another measurement device 38 is in communication with the communication device 40 and, further, the measurement device 38 is in communication with an end cap element 64. Again, this communication device 40 is in communication with the control mechanism 30 and used to receive, process and/or transmit the data monitored and gathered by the measurement device 38. It is also envisioned that the communication device 40 is in wireless communication with the control mechanism 30, which acts as a central repository for all the gathered data.

The end cap element 64 is positioned at least partially within the liner conduit second end 22 and acts as a seal at the liner conduit second end 22. Since the measurement device 30 is connected to the end cap element 64, it measures various parameters, such as pressure and temperature near the liner conduit second end 22. A third expansion restriction sleeve 66 is placed at least partially over the host conduit second end 18 and the liner conduit second end 22. It is envisioned that the third expansion restriction sleeve 66 operates in a similar manner as the second expansion sleeve 58. Therefore, if desired, the transition collar 60 may also be used to provide a smooth transition zone at the host conduit second end 18.

Again, as with the injection hardware 24, a fourth expansion restriction sleeve 68 is positioned around the liner conduit second end 22 and adjacent the end cap element 64. Both the third expansion restriction sleeve 66 and the fourth expansion restriction sleeve 68 act to rigidly prevent lateral expansion of the liner conduit 12 with relation to the host conduit 14. In addition, as with the injection hardware 24, the distal end hardware 26 includes the longitudinal restriction connection 62 for preventing unwanted longitudinal expansion during the process. In this preferred and non-limiting embodiment, the longitudinal restriction 62 is rigidly attached to both the host conduit second end 18 and the end cap element 64. It is also envisioned that the insert 52 can be used in connection with the distal end hardware 26 for stiffening of the liner conduit 12. Further, the end cap element 64 may be substituted with a plug, cap or other similar element as would be known and appreciated by one of ordinary skill in the art.

Figure 4:
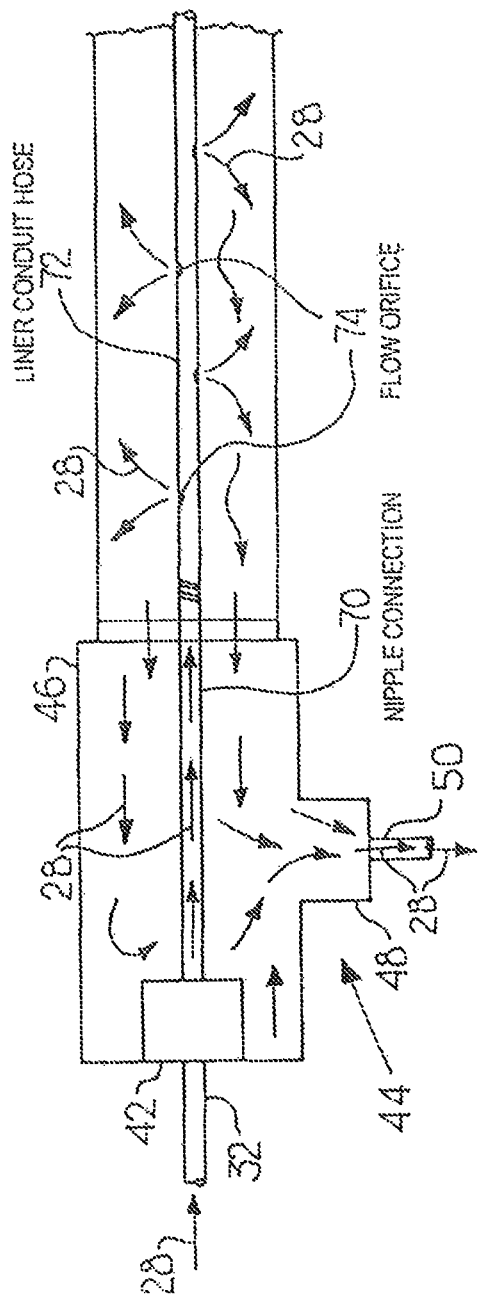
FIG. 4 is a schematic view of material flow in subcomponents of the injection hardware of FIG. 2.

An internal schematic view of the flow connection 44 of the injection hardware 24 is illustrated in FIG. 4. With respect to this section of the system 10, material 28 is injected through the inlet hose 32, and the inlet hose 32 is in operable communication with the fitting 42, which is, in turn, connected to a nipple connection 70. The nipple connection 70 extends through an internal cavity of the flow connection 44 and, typically, at least partially within the liner conduit 12. The nipple connection is engaged with a liner conduit hose 72, and the liner conduit hose 72 extends along the length of the liner conduit 12. The nipple connection 70 and the liner conduit hose 72 are engaged in a manner as known in the art, such as by threaded fittings, or other similar connection techniques. The liner conduit hose 72 includes multiple flow orifices 74 positioned along the length of the liner conduit hose 72. These flow orifices 74 allow material 28 to be intermittently injected along the length of the liner conduit hose 72, which provides for a more uniform injection of material 28 and, therefore, a more uniform expansion of the liner conduit 12. In a preferred and non-limiting embodiment, the orifices 74 are positioned on the hose 72 near the host conduit second end 18, which provides a more even heat distribution along the liner conduit 12. Further, the orifices 74 may preferably be disposed on a bottom portion of the liner conduit hose 72.

In operation, once the material 28 moves through the nipple connection 70 and further through the liner conduit hose 72 and out the flow orifices 74, and due to the end cap element 64, the liner conduit 12 is filled with material 28. Next, this material 28 flows back through the liner conduit 12 in a recycle route, after encountering the liner conduit second end 22, and moves further through the liner conduit 12 back into the flow connection 44. Due to the internal structure of the flow connection 44, the material 28 is now flowing on the outside of the nipple connection 70 and moves through the recycle port 48 of the flow connection 44. The material 28 flows through the recycle hose 50 and back into the fluid system (not shown). In this manner, the injection hardware 24 acts as both an injection and recycle route for the material 28 for further use in the system 10. While the injection material 28, as discussed above, is preferably a fluid, the present invention is not so limited. The material 28 may be a gas, a liquid, a solid, a semi-solid, a mechanism, an object, steam, water, heated water, etc.

It should be noted that the above-discussed and specific arrangement of the components and subcomponents of the injection hardware 24 and the distal end hardware 26 represents only exemplary embodiments. It is also envisioned that the injected material 28 may be both injected through and recycled from the injection hardware 24, while alternatively, the injected material 28 may be injected through the injection hardware 24 and removed at the distal end hardware 26. It is only necessary that the material 28 is somehow inserted or injected appropriately into the system and, if required, removed therefrom.

The control mechanism 30 may be a computing device, such as a portable computer, laptop, a PDA, a palmtop, a computer, a personal computer, a networked computer or a server. In a further preferred and non-limiting embodiment, the control mechanism is loaded with control software to enable the control mechanism to perform various functions and actions. For example, the control software may allow the control mechanism to (i) receive and process signals transmitted from at least one of the injection hardware 24 and the distal end hardware 26; (ii) transmit signals to at least one of the injection hardware 24 and the distal end hardware 26; (iii) monitor at least one physical characteristic of at least one of the reparation process, the injection hardware 24, the distal end hardware 26, the material 28 in contact with the injection hardware 24, the material 28 in contact with the distal end hardware 26; (iv) track at least one physical characteristic of at least one of the reparation process, the injection hardware 24, the distal end hardware 26, the material 28 in contact with the injection hardware 24, the material 28 in contact with the distal end hardware 26; (v) control at least one physical characteristic of at least one of the reparation process, the injection hardware 24, the distal end hardware 26, the material 28 in contact with the injection hardware 24, the material 28 in contact with the distal end hardware 26; (vi) control operation of at least one component of at least one of the injection hardware 24 and the distal end hardware 26; and (vii) storing data directed to at least one physical characteristic of at least one of the reparation process, the injection hardware 24, the distal end hardware 26, the material 28 in contact with the injection hardware 24, the material 28 in contact with the distal end hardware 26, an operation parameter of the injection hardware 24 and an operation parameter of the distal end hardware 26.

Figure 5:
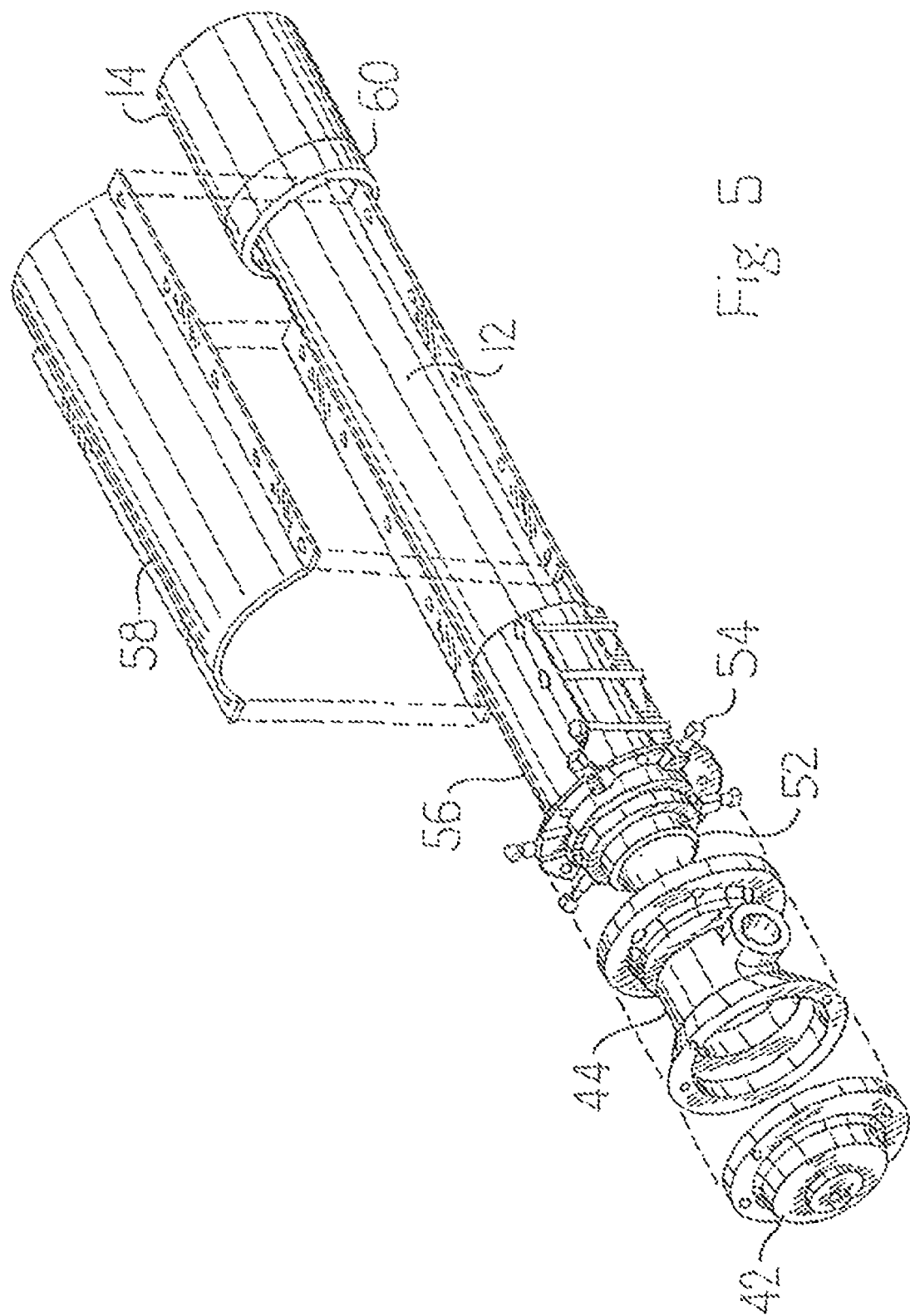
FIG. 5 is a perspective view of a preferred embodiment of the injection hardware of the system and arrangement according to FIG. 1.

One preferred and non-limiting embodiment of the injection hardware 24 is illustrated in FIG. 5. While specific conduit/piping and hardware connections are described, any manner and method of injecting material 28 in a controllable situation is envisioned. The measurement devices 38 may be used to monitor specific operating parameters for use in not only controlling the current process, but making further improvements in future processes. Therefore, the system 10 and arrangement for conduit expansion allows for the expansion of the liner conduit 12 within the host conduit 14 with additional structural integrity advantages not inherent in prior art. In addition, and as discussed above, the system 10 is equally useful in a variety of conduit reparation processes, as are known and practiced in the art.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A method of conduit reparation including an existing, host conduit and a tubular target conduit formed from a rigid, thermoplastic material, the method comprising:
   providing injection hardware in operative communication with an injection end of at least one of the host conduit and the target conduit;
   providing distal end hardware in operative communication with a distal end of at least one of the host conduit and the target conduit;
   providing a control mechanism in communication with at least one of the injection hardware and the distal end hardware, the control mechanism configured to at least one of communicate with and control at least one of the following: the conduit reparation process, the injection hardware, the distal end hardware or any combination thereof;
   positioning the target conduit having a first diameter within the host conduit while maintaining the target conduit in a rigid state;
   expanding the target conduit by injecting a heated, pressurized gas or liquid material directly into an inner area of the target conduit, such that the temperature and pressure of the gas or liquid cause the target conduit to expand to a second, larger diameter resulting in a structural, expanded target conduit, the heated, pressurized gas or liquid material is at least one of injected through the injection hardware to provide injected material and recycled from the injection hardware to provide recycled material; and
   controlling, by the control mechanism, at least one of the following: the temperature, pressure, volume or any combination thereof, of the heated, pressurized gas or liquid.

2. The method of claim 1, wherein the rigid, thermoplastic material is at least one of the following: polyvinyl chloride, polyethylene, an expandable thermoplastic or any combination thereof.

3. The method of claim 1, wherein the gas or liquid is at least one of the following: water, heated water, steam or any combination thereof.

4. The method of claim 1, further comprising at least one of the following:
   (i) monitoring at least one physical characteristic of at least one of the injected material and recycled material;
   (ii) controlling at least one physical characteristic of at least one of the injected material and recycled material;
   (iii) monitoring at least one physical characteristic of the reparation process;
   (iv) controlling at least one physical characteristic of the reparation process;
   (v) monitoring at least one physical characteristic of at least one of the host conduit and the target conduit;
   (vi) controlling at least one physical characteristic of at least one of the host conduit and the target conduit;
   or any combination thereof.

5. The method of claim 1, further comprising controlling flow characteristics of the material through the injection hardware.

6. The method of claim 1, further comprising measuring at least one physical characteristic of at least one of the following: the injected material, the recycled material, the reparation process, the host conduit, the target conduit or any combination thereof.

7. The method of claim 1, further comprising measuring at least one of the pressure and the temperature of at least one of the injected material and recycled material.

8. The method of claim 1, further comprising measuring a surface temperature of at least one of the host conduit and the target conduit.

9. The method of claim 1, further comprising controlling at least one of lateral expansion and circumferential expansion of the target conduit.

10. The method of claim 1, further comprising providing a surface against which the target conduit may expand.

11. The method of claim 1, further comprising preventing at least one of the injected material and recycled material from exiting the target conduit.

12. The method of claim 1, further comprising providing wireless communication between at least one of the following: the control mechanism, the injection hardware, the distal end hardware or any combination thereof.

13. A method of conduit reparation including an existing, host conduit and a tubular target conduit formed from a rigid, thermoplastic material, the method comprising:
   positioning the target conduit having a first diameter within the host conduit, such that the target conduit is maintained in a rigid state;
   expanding the target conduit by injecting a heated, pressurized gas or liquid material directly into an inner area of the target conduit through injection hardware, such that the temperature and pressure of the gas or liquid cause the target conduit to expand to a second, larger diameter resulting in a structural, expanded target conduit; and controlling at least one of the following: the temperature, pressure, volume or any combination thereof, of the heated, pressurized gas or liquid.

14. A method of conduit reparation including an existing, host conduit and a tubular target conduit formed from a rigid, thermoplastic material, the method comprising:

positioning the target conduit having a first diameter within the host conduit, such that the target conduit is maintained in a rigid state;

expanding the target conduit by injecting a heated, pressurized gas or liquid material directly into an inner area of the target conduit through injection hardware, such that the temperature and pressure of the gas or liquid cause the target conduit to expand to a second, larger diameter resulting in a structural, expanded target conduit; and controlling at least one of the conduit reparation process and the injection hardware.

15. A method of conduit reparation including an existing host conduit and a tubular target conduit formed from a rigid, thermoplastic material, the method comprising:

providing injection hardware in operative communication with an injection end of at least one of the host conduit and the target conduit;

providing distal end hardware in operative communication with a distal end of at least one of the host conduit and the target conduit;

providing a control mechanism in communication with at least one of the injection hardware and the distal end hardware, the control mechanism configured to at least communicate with and control at least one of the following: the conduit reparation process, the injection hardware, the distal end hardware, or any combination thereof;

positioning the target conduit having a first diameter within the host conduit while maintaining the target conduit in a rigid state;

expanding the target conduit by injecting a heated, pressurized gas or liquid material directly into an inner area of the target conduit through at least one of a plurality of orifices of a target conduit hose, thereby contacting an internal surface of the target conduit, such that the temperature and pressure of the gas or liquid cause the target conduit to expand to a second, larger diameter resulting in a structural, expanded target conduit, wherein the heated, pressurized gas or liquid material is at least one of injected through the injection hardware to provide injected material and recycled from the injection hardware to provide recycled material; and controlling, by the control mechanism, at least one of the following: the temperature, pressure, volume, or any combination thereof, of the heated, pressurized gas or liquid.

16. The method of claim 15, further comprising controlling flow characteristics of the material through the injection hardware.

17. The method of claim 15, further comprising measuring at least one physical characteristic of at least one of the following: the injected material, the recycled material, the reparation process, the host conduit, the target conduit, or any combination thereof.

18. The method of claim 15, further comprising measuring at least one of the pressure and the temperature of at least one of the injected material and recycled material.

19. The method of claim 15, further comprising measuring a surface temperature of at least one of the host conduit and the target conduit.

* * * * *